United States Patent
Cao et al.

(10) Patent No.: US 10,762,033 B2
(45) Date of Patent: Sep. 1, 2020

(54) METHOD AND APPARATUS FOR UPDATING SERVER FIRMWARE IN SERVER, AND SERVER

(71) Applicant: Beijing Baidu Netcom Science and Technology Co., Ltd., Beijing (CN)

(72) Inventors: Kai Cao, Beijing (CN); Lei Song, Beijing (CN); Xu Jiang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 138 days.

(21) Appl. No.: 15/889,996

(22) Filed: Feb. 6, 2018

(65) Prior Publication Data

US 2018/0329862 A1 Nov. 15, 2018

(30) Foreign Application Priority Data

May 11, 2017 (CN) .......................... 2017 1 0330722

(51) Int. Cl.
| | |
|---|---|
| *G06F 15/177* | (2006.01) |
| *G06F 9/50* | (2006.01) |
| *G06F 21/57* | (2013.01) |
| *G06F 8/65* | (2018.01) |
| *G06F 9/4401* | (2018.01) |
| *G06F 8/60* | (2018.01) |
| *G06F 9/445* | (2018.01) |
| *G06F 8/61* | (2018.01) |

(52) U.S. Cl.
CPC .............. *G06F 15/177* (2013.01); *G06F 8/65* (2013.01); *G06F 9/4401* (2013.01); *G06F 9/5027* (2013.01); *G06F 21/572* (2013.01); *G06F 8/60* (2013.01); *G06F 8/61* (2013.01); *G06F 8/66* (2013.01); *G06F 9/44505* (2013.01)

(58) Field of Classification Search
CPC ........ G06F 15/177; G06F 8/65; G06F 9/4401; G06F 9/44505; G06F 8/60; G06F 8/61; G06F 8/66; G06F 9/5027; G06F 21/572
USPC .......................... 713/1, 2, 100; 717/168, 173
See application file for complete search history.

(56) References Cited

U.S. PATENT DOCUMENTS

| | | | |
|---|---|---|---|
| 7,293,165 B1 * | 11/2007 | Tobias ..................... | G06F 8/66 713/1 |
| 9,502,082 B1 * | 11/2016 | Dang ..................... | G11C 5/147 |

(Continued)

FOREIGN PATENT DOCUMENTS

| | | |
|---|---|---|
| CN | 101593120 A | 12/2009 |
| CN | 102495742 A | 6/2012 |
| CN | 104516751 A | 4/2015 |

*Primary Examiner* — Ji H Bae
(74) *Attorney, Agent, or Firm* — Seed IP Law Group LLP

(57) ABSTRACT

The present disclosure discloses a method and apparatus for updating server firmware in a server. The server is based on a Purley platform, a South Bridge chip of the server is electrically connected to a BMC through an ESPI bus, and the BMC is electrically connected to a firmware memory storing server firmware and a BMC memory through the ESPI bus. An embodiment of the method includes: performing a read operation on an image file for updating the server firmware stored in the BMC memory by using the BMC, when a preset upgrading condition is satisfied; and updating the server firmware stored in the firmware memory based on information read from the read operation. This embodiment achieves an updating of server firmware without additional hardware.

10 Claims, 6 Drawing Sheets

(56) References Cited

U.S. PATENT DOCUMENTS

| | | | |
|---|---|---|---|
| 2009/0006834 A1* | 1/2009 | Rothman | G06F 8/65 |
| | | | 713/2 |
| 2016/0261455 A1* | 9/2016 | Su | H04L 41/069 |
| 2016/0283221 A1* | 9/2016 | Kochar | G06F 9/45558 |
| 2017/0046151 A1* | 2/2017 | Hsu | G06F 9/44505 |
| 2017/0131991 A1* | 5/2017 | Su | G06F 8/66 |

* cited by examiner

METHOD AND APPARATUS FOR UPDATING SERVER FIRMWARE IN SERVER, AND SERVER

CROSS-REFERENCE TO RELATED APPLICATION

This application is related to and claims priority from Chinese Application No. 201710330722.7, filed on May 11, 2017 and entitled "Method and Apparatus for Updating Server Firmware in Server, and Server", the entire disclosure of which is hereby incorporated by reference.

TECHNICAL FIELD

The present application relates to the field of computer technology, specifically to the field of server technology, and more specifically to a method and apparatus for updating server firmware in a server, and a server.

BACKGROUND

Firmware refers to software that is embedded in hardware. It stores the most basic parameters of hardware devices in the computer system, in order to provide the most basic and direct hardware control to the system. In the server, it is also necessary to provide hardware control to the system through the firmware. In order to enable the server firmware to provide new functionality or to solve problems associated with the previous version, the server firmware needs to be updated to keep the server in a more stable and secure state.

Existing firmware updating methods may be referred to the schematic structural diagrams shown in FIG. 1 and FIG. 2. The Baseboard Management Controller (BMC) is shown in FIG. 1 and FIG. 2, which is a dedicated service processor usually used to monitor physical variables of the server such as the temperature, humidity, power supply voltage, fan speed, communication parameters and operation system functions, to enable functions such as diagnostics, console support, configuration management, hardware management and troubleshooting. In the architecture shown in FIG. 1, an image file for updating the firmware is stored in the BMC memory 104, and the image file must be loaded into the firmware memory 102 through the BMC 103 and the South Bridge chip 101 to complete the firmware update, so that the updating process must rely on the server's operation to be completed, however, updating the firmware when the server is in operation may affect other functions when the server executes. In the architecture shown in FIG. 2, an image file for updating the firmware is stored in the BMC memory 203, and the switching circuit 204 is connected to the South Bridge chip 201 when the firmware is not updated. When firmware update is needed, the switching circuit 204 is switched to be connected to the BMC 202. Then, the image file stored in the BMC memory 203 may be loaded into the main firmware memory 205 and the backup firmware memory 206 through the switching circuit 204, to complete the update process for the server firmware. This method must depend on the completion of the switching the components connected to the switching circuit 204 between the Southbridge 201 and the BMC 202, relying on an additional switching circuit. The hardware cost needs to be increased. Therefore, there is a need to improve the existing server firmware update solution.

SUMMARY

The present disclosure provides an improved method and apparatus for updating server firmware in a server, in order to solve the technical problem mentioned in the foregoing Background section.

In a first aspect, an embodiment of the present disclosure provides a method for updating server firmware in a server. The server is based on a Purley platform, a South Bridge chip of the server is electrically connected to a BMC through an ESPI bus, the BMC is electrically connected to a firmware memory storing server firmware and a BMC memory through the ESPI bus, and the method comprises: performing a read operation on an image file for updating the server firmware stored in the BMC memory by using the BMC, when a preset upgrading condition is satisfied; and updating the server firmware stored in the firmware memory based on information read from the read operation.

In some embodiments, before the performing a read operation on an image file for updating the server firmware stored in the BMC memory by using the BMC, the method further comprises: receiving the image file for updating the server firmware remotely uploaded by a user by using a network interface and a serial interface of the BMC, and storing the image file in the BMC memory.

In some embodiments, the upgrading condition comprises restarting the server.

In a second aspect, an embodiment of the present disclosure provides an apparatus for updating server firmware in a server, wherein the server is based on a Purley platform, a South Bridge chip of the server is electrically connected to a BMC through an ESPI bus, the BMC is electrically connected to a firmware memory storing server firmware and a BMC memory through the ESPI bus, and the apparatus comprises: a reading unit, configured to perform a read operation on an image file for updating the server firmware stored in the BMC memory by using the BMC, when a preset upgrading condition is satisfied; and an updating unit, configured to update the server firmware stored in the firmware memory based on information read from the read operation.

In some embodiments, the apparatus further comprises: a receiving unit, configured to receive the image file for updating the server firmware remotely uploaded by a user by using a network interface and a serial interface of the BMC and store the image file in the BMC memory.

In some embodiments, the upgrading condition comprises restarting the server.

In a third aspect, an embodiment of the present disclosure provides a server. The server is based on a Purley platform, and comprises a South Bridge chip, a BMC, a firmware memory storing server firmware and a BMC memory, the South Bridge chip is electrically connected to the BMC through an ESPI bus, and the BMC is electrically connected to the firmware memory and the BMC memory through the ESPI bus, wherein the BMC memory is configured to store an image file for updating server firmware; and the BMC is configured to perform a read operation on the image file for updating server firmware stored in the BMC memory, when a preset upgrading condition is satisfied, and update the server firmware stored in the firmware memory based on information read from the read operation.

In some embodiments, the BMC is further configured to: receive the image file for updating the server firmware remotely uploaded by a user by using a network interface and a serial interface of the BMC and store the image file in the BMC memory.

In some embodiments, the upgrading condition comprises restarting the server.

In a fourth aspect, an embodiment of the present disclosure provides a computer readable storage medium storing a computer program, wherein the computer program, when executed by a processor, causes the processor to perform the method as described in the first aspect.

The method and apparatus for updating server firmware in a server provided by the present disclosure use the Purley platform as a server architecture and use the ESPI bus as a bus for connecting components, so that the BMC only needs to be directly mounted on the South Bridge chip of the server and at the same time electrically connected to the firmware memory storing the server firmware and the BMC memory, to update the server firmware in the firmware memory by using the image file for updating server firmware in the firmware memory when the upgrading condition is satisfied, without using an additional hardware circuit, and achieving an out-of-band upgrading of the server firmware with low cost.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 3:
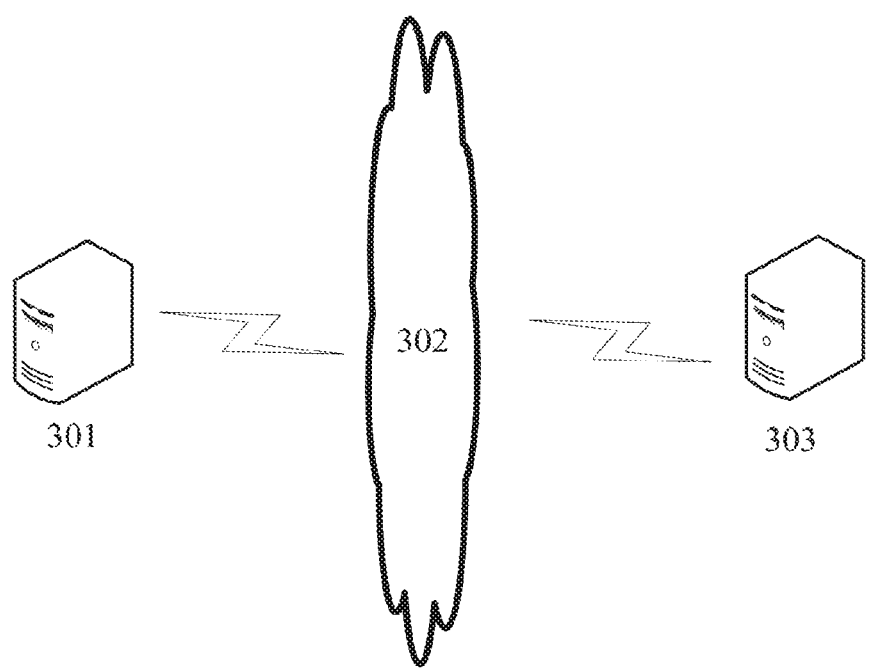
FIG. 3 is an exemplary system architecture diagram to which the present disclosure may be applied.

FIG. 3 shows an exemplary system architecture 300 to which a method or apparatus for updating server firmware in a server of an embodiment of the application may be applied.

As shown in FIG. 3, the system architecture 300 may include a server 301 with firmware to be updated, a network 302 and a firmware server 303. The network 302 is a medium used to provide a communication link between the server 301 with firmware to be updated and the firmware server 303. The network 302 may include various types of connections, such as wired or wireless communication links or optical fiber cables.

The server 301 with firmware to be updated may interact with the firmware server 303 through the network 302, to receive an image file for updating server firmware. The firmware server 303 may be a server that provides a firmware service, for example, a backend server that provides the support for the image file for updating required by the server with firmware to be updated. The backend server may send, based on a request or automatically, the image file for updating to the server 301 with firmware to be updated.

It needs to be noted that the method for updating server firmware in a server provided by embodiments of the present disclosure is generally executed by the server 301 with firmware to be updated, and accordingly, the apparatus for updating server firmware in a server is generally provided in the server 301 with firmware to be updated.

It should be understood that the numbers of the servers with firmware to be updated, the networks and the firmware servers in FIG. 3 are merely illustrative. Any number of servers with firmware to be updated, networks and firmware servers may be provided based on the implementation requirements.

Figure 4:
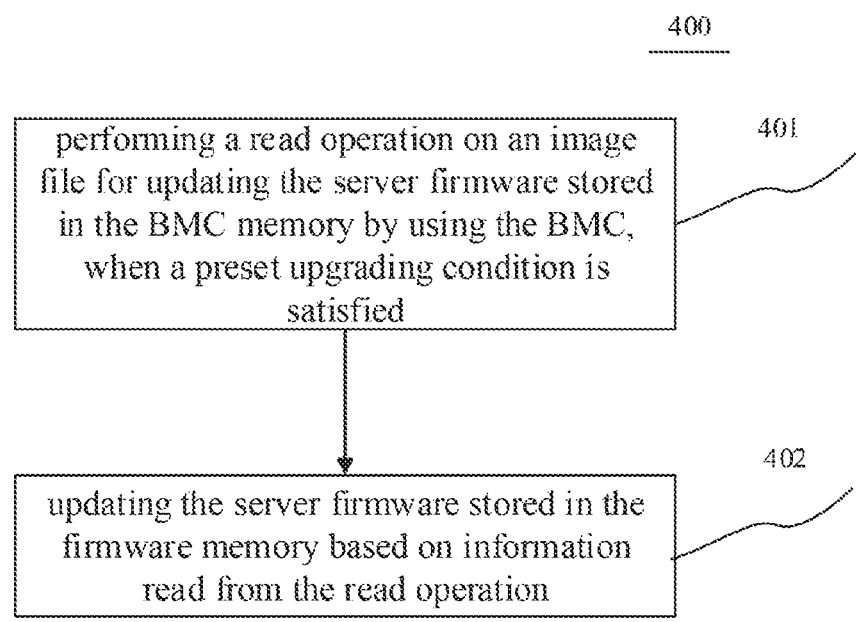
FIG. 4 is a flowchart of an embodiment of a method for updating server firmware of a server according to the present disclosure.

With further reference to FIG. 4, a flow 400 of an embodiment of a method for updating server firmware in a server according to the present disclosure is shown. The server is based on a Purley platform, a South Bridge chip of the server is electrically connected to a BMC through an ESPI bus, and the BMC is electrically connected to a firmware memory and a BMC memory respectively through the ESPI bus. Here, the Purley platform is a server platform newly launched by the Intel Corporation, with a 6-channel and 12-slot DDR4 and a 48-channel PCIe. In addition, the Purley platform also supports QAT (QuickAssist technology). The firmware memory may be a memory storing firmware used by the above server. In practice, the firmware memory may be a read-only memory (ROM), a flash memory (flash), or other types of memories. The BMC (Baseboard Management Controller) is a dedicated service processor that is typically used to monitor physical variables of a server, such as the temperature, humidity, power supply voltage, fan speed, communication parameters and operation system functions, to enable functions such as diagnostics, console support, configuration management, hardware management and troubleshooting. The BMC memory is a memory for providing storage support for the BMC. Types of the BMC memories may also include, but not limited to, ROM, Flash, and the like. The method for updating server firmware in a server comprises the following steps.

Step 401, performing a read operation on an image file for updating the server firmware stored in the BMC memory by using the BMC, when a preset upgrading condition is satisfied.

In the present embodiment, an image file for server updating may be pre-stored in the BMC memory, and the image file for server updating may be received by the BMC through the network architecture shown in FIG. 3 from a remote device.

In addition, a certain upgrading condition may be preset in an electronic device. When the step 401 is performed, the electronic device may continuously detect whether the upgrading condition is satisfied, and perform a subsequent step when the upgrading condition is satisfied. Here, the subsequent step is to perform a read operation on an image file for updating the server firmware stored in the BMC memory by using the BMC. The above upgrading condition may be set as needed.

Step 402, updating the server firmware stored in the firmware memory based on information read from the read operation.

In the present embodiment, based on the information read from the read operation performed on the image file for updating server firmware in the step 401, the electronic device updates the server firmware stored in the firmware memory by using the information.

In some alternative implementations of the present embodiment, before the step 401, the method further includes: receiving the image file for updating the server firmware remotely uploaded by a user by using a network interface and a serial interface of the BMC, and storing the image file in the BMC memory. In this implementation, the image file for updating may be remotely obtained through the network interface and the serial interface of the BMC in advance, such that the subsequent firmware updating process may be successfully performed.

In some alternative implementations of the present embodiment, the upgrading condition comprises restarting the server. In this implementation, the upgrading condition is set to be the server restart, so that the firmware updating may be performed while the server is not in full operation. Thus, it may be avoided that other functions will be impacted by the updating of the firmware in the operation of the server, and no additional time is required to update the firmware.

In the method provided in the above embodiment of the present disclosure, since the Purley platform is selected as the server architecture and the ESPI bus is used as the bus for connecting components, the BMC only needs to be directly mounted on the South Bridge chip of the server and electrically connected to both of the firmware memory storing the server firmware and the BMC memory. Then, the server firmware in the firmware memory can be updated by using the image file for updating server firmware in the firmware memory, when the upgrading condition is satisfied, without using an additional hardware circuit, thereby achieving an out-of-band upgrading of the server firmware with a low cost.

Figure 1:
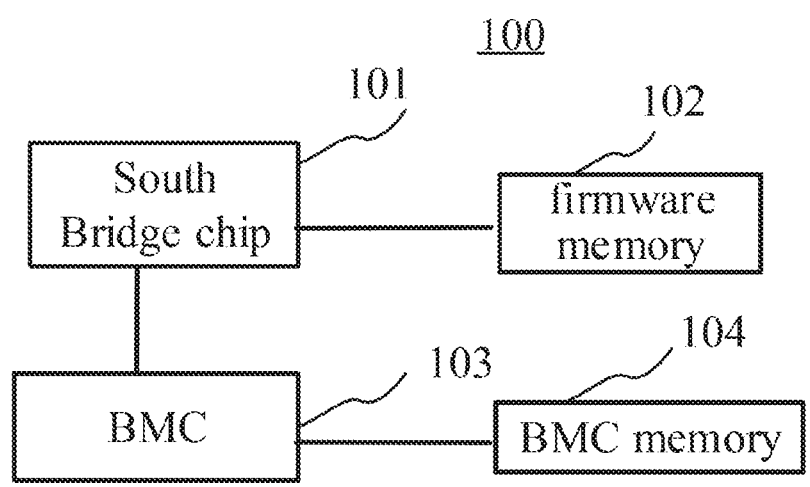
FIG. 1 and FIG. 2 are two types of system architecture diagrams for server firmware upgrading in existing technology.
Figure 2:
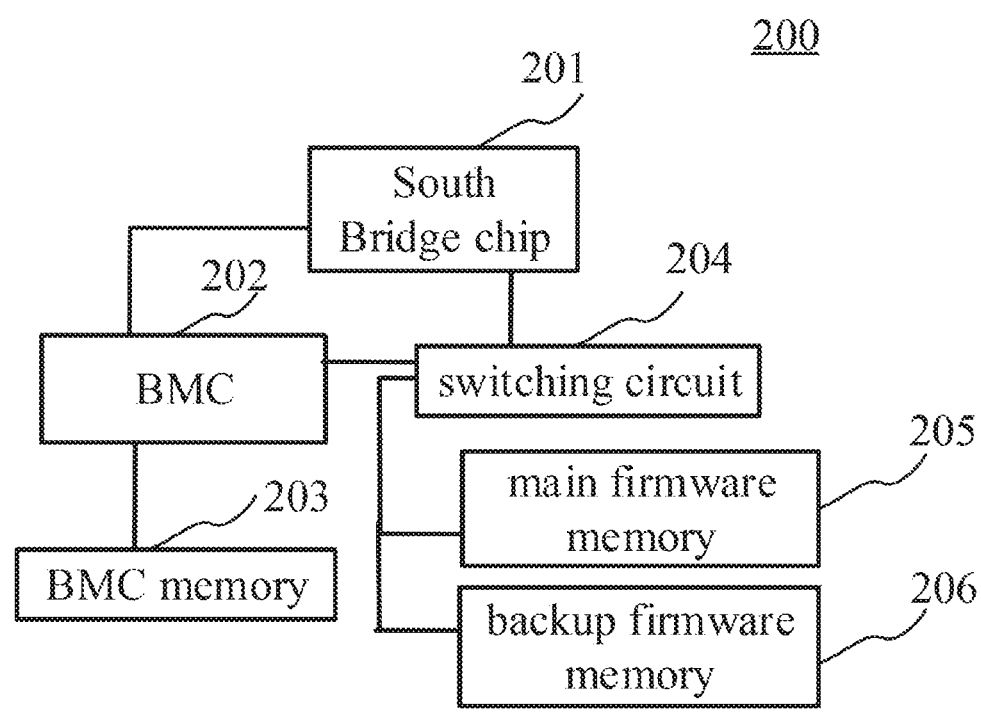
Figure 5:
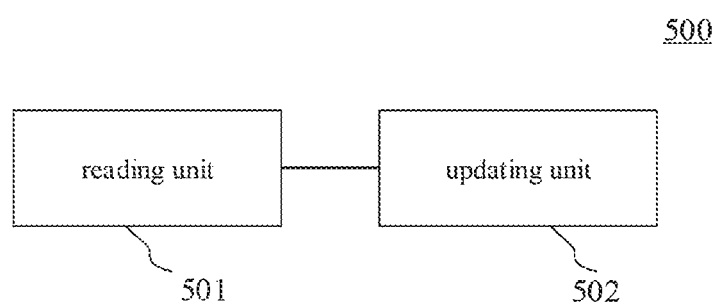
FIG. 5 is a schematic structural diagram of an embodiment of an apparatus for updating server firmware of a server according to the present disclosure.

With further reference to FIG. 5, the present disclosure provides an embodiment of an apparatus for updating server firmware in a server, as an implementation to the method illustrated in the above FIG. 2. The apparatus embodiment corresponds to the method embodiment shown in FIG. 2, and the apparatus may be specifically applied to various servers with firmware upgrading. The server is based on the Purley platform, a South Bridge chip of the server is electrically connected to the BMC through the ESPI bus, and the BMC is electrically connected to the firmware memory storing server firmware and the BMC memory through the ESPI bus. Here, the firmware memory is a memory in the server used to store server firmware. The firmware memory includes but is not limited to a BIOS flash.

As shown in FIG. 5, an apparatus 500 for updating server firmware in a server of the present embodiment includes: a reading unit 501 and an updating unit 502. Here, the reading unit 501 is configured to perform a read operation on an image file for updating the server firmware stored in the BMC memory by using the BMC, when a preset upgrading condition is satisfied; and the updating unit 502 is configured to update the server firmware stored in the firmware memory based on information read from the read operation.

In the present embodiment, the specific processing of the reading unit 501 and the updating unit 502 may refer to the step 401 and the step 402 in the corresponding embodiment in FIG. 4, and thus the detailed description thereof will be omitted.

In some alternative implementations of the present embodiment, the apparatus 500 further includes: a receiving unit (not shown), configured to receive the image file for updating the server firmware remotely uploaded by a user by using a network interface and a serial interface of the BMC and store the image file in the BMC memory. The specific processing of this implementation may refer to the related implementation in the corresponding embodiment in FIG. 4, and thus the detailed description thereof will be omitted.

In some alternative implementations of the present embodiment, the upgrading condition comprises restarting the server. The specific processing of this implementation may refer to the related implementation in the corresponding embodiment in FIG. 4, and thus the detailed description thereof will be omitted.

Figure 6:
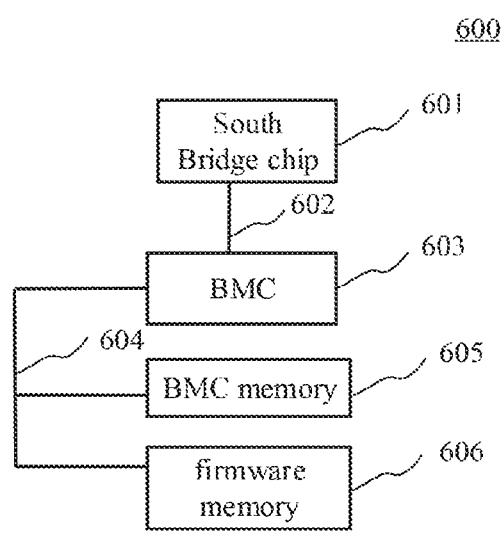
FIG. 6 is a schematic structural diagram of a server adapted to implement embodiments of the present disclosure.

The present disclosure also provides a server. With reference to FIG. 6, a schematic structural diagram of a server 600 adapted to implement embodiments of the present disclosure is illustrated. The server shown in FIG. 6 is merely an example and should not impose any restriction on the functions and the scope of the embodiments of the present disclosure.

As shown in FIG. 6, the server is based on a Purley platform and comprises a South Bridge chip, a Baseboard Management Controller (BMC), a firmware memory storing server firmware and a BMC memory. The South Bridge chip is electrically connected with the BMC through an ESPI bus, and the BMC is electrically connected with the firmware memory and the BMC memory through the ESPI bus. The BMC memory is configured to store an image file for updating server firmware. The BMC is configured to perform a read operation on the image file for updating server firmware stored in the BMC memory, when a preset upgrading condition is satisfied, and update the server firmware stored in the firmware memory based on information read from the read operation.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a reading unit and an updating unit, where the names of these units or modules do not in some cases constitute a limitation to such units or modules themselves. For example, the updating unit may also be described as "a unit for updating the server firmware stored in the firmware memory based on information read from the read operation."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: perform a read operation on an image file for updating the server firmware stored in the BMC memory by using the BMC, when a preset upgrading condition is satisfied; and update the server firmware stored in the firmware memory based on information read from the read operation.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method, comprising:
   employing a Baseboard Management Controller (BMC) to perform an out-of-band update of server firmware in a server by performing actions, the BMC being directly mounted on a South Bridge chip of the server and being electrically connected with the South Bridge chip through an ESPI bus, and the BMC being electrically connected with a firmware memory storing server firmware and with a BMC memory through the ESPI bus, the server being based on a Purley platform, ESPI bus, the actions including:
   continuously detecting whether a preset upgrading condition is satisfied, and performing, through the ESPI bus, a read operation on an image file stored in the BMC memory by using the BMC, when the preset upgrading condition is satisfied, wherein the image file is for updating the server firmware; and
   updating, through the ESPI bus, the server firmware stored in the firmware memory based on information read from the read operation.

2. The method according to claim 1, wherein before the performing a read operation on the image file stored in the BMC memory by using the BMC, the method further comprises:
   receiving the image file remotely uploaded by a user by using a network interface and a serial interface of the BMC, and storing the image file in the BMC memory.

3. The method according to claim 1, wherein the preset upgrading condition includes restarting the server.

4. An apparatus, comprising:
   at least one processor; and
   a memory storing instructions, which when executed by the at least one processor, cause the at least one processor to perform operations, the operations comprising:
   employing a Baseboard Management Controller (BMC) to perform an out-of-band update of server firmware in a server by performing actions, the BMC being directly mounted on a South Bridge chip of the server and being electrically connected with the South Bridge chip through an ESPI bus, and the BMC being electrically connected with a firmware memory storing server firmware and with a BMC memory through the ESPI bus, the server being based on a Purley platform, the actions including:
   continuously detecting whether a preset upgrading condition is satisfied, and performing, through the ESPI bus, a read operation on an image file stored in the BMC memory by using the BMC, when the preset upgrading condition is satisfied, wherein the image file is for updating the server firmware; and
   updating, through the ESPI bus, the server firmware stored in the firmware memory based on information read from the read operation.

5. The apparatus according to claim 4, wherein before the performing a read operation on the image file stored in the BMC memory by using the BMC, the operations further comprises:
   receiving the image file remotely uploaded by a user by using a network interface and a serial interface of the BMC and store the image file in the BMC memory.

6. The apparatus according to claim 4, wherein the preset upgrading condition comprises restarting the server.

7. A server being based on a Purley platform and comprising:
   a South Bridge chip;
   a firmware memory storing server firmware;
   a Baseboard Management Controller (BMC) memory configured to store an image file for updating the server firmware; and
   a BMC directly mounted on the South Bridge chip and being electrically connected with the South Bridge chip through an ESPI bus, and the BMC being electrically connected with a firmware memory storing server firmware and with a BMC memory through the ESPI bus, the BMC is configured to:
      perform an out-of-band update of the server firmware by continuously detecting whether a preset upgrading condition is satisfied, and performing, through the ESPI bus, a read operation on the image file stored in the BMC memory, when the preset upgrading condition is satisfied, wherein the image file is for updating the server firmware; and
      update, through the ESPI bus, the server firmware stored in the firmware memory based on information read from the read operation.

8. The server according to claim 7, wherein the BMC is further configured to:
   receive the image file remotely uploaded by a user by using a network interface and a serial interface of the BMC and store the image file in the BMC memory.

9. The server according to claim 7, wherein the preset upgrading condition comprises restarting the server.

10. A non-transitory computer readable storage medium storing a computer program, wherein the computer program, when executed by a processor, causes the processor to:
   employ a Baseboard Management Controller (BMC) to perform an out-of-band update of server firmware in a server by performing actions, the BMC being directly mounted on a South Bridge chip of the server and being electrically connected with the South Bridge chip through an ESPI bus, and the BMC being electrically connected with a firmware memory storing server firmware and with a BMC memory through the ESPI bus, the server being based on a Purley platform, the actions including: continuously detecting whether a preset upgrading condition is satisfied, and performing, through the ESPI bus, a read operation on an image file stored in the BMC memory by using the BMC, when the preset upgrading condition is satisfied, wherein the image file is for updating the server firmware; and updating, through the ESPI bus, the server firmware stored in the firmware memory based on information read from the read operation.

* * * * *

UNITED STATES PATENT AND TRADEMARK OFFICE
CERTIFICATE OF CORRECTION

PATENT NO. : 10,762,033 B2
APPLICATION NO. : 15/889996
DATED : September 1, 2020
INVENTOR(S) : Kai Cao et al.

Page 1 of 1

It is certified that error appears in the above-identified patent and that said Letters Patent is hereby corrected as shown below:

In the Claims

Column 8, Claim 1, Lines 15-16:
"on a Purley platform, ESPI bus, the actions including:"
Should read:
--on a Purley platform, the actions including:--

Signed and Sealed this
Nineteenth Day of January, 2021

Andrei Iancu
*Director of the United States Patent and Trademark Office*